(12) United States Patent
Tanaka et al.

(10) Patent No.: US 9,920,722 B2
(45) Date of Patent: Mar. 20, 2018

(54) INTAKE SYSTEM OF ENGINE

(71) Applicant: MAZDA MOTOR CORPORATION, Hiroshima (JP)

(72) Inventors: Fusatoshi Tanaka, Higashihiroshima (JP); Mikiko Kojo, Hiroshima (JP); Motoo Hayakawa, Kure (JP); Shigehiro Sakogawa, Hiroshima (JP); Hitoshi Hongou, Hiroshima (JP); Norifumi Irie, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 169 days.

(21) Appl. No.: 14/882,935

(22) Filed: Oct. 14, 2015

(65) Prior Publication Data

US 2016/0108870 A1    Apr. 21, 2016

(30) Foreign Application Priority Data

Oct. 16, 2014    (JP) .................................. 2014-211668

(51) Int. Cl.
 *F02M 35/00*    (2006.01)
 *F02M 35/108*    (2006.01)
    (Continued)

(52) U.S. Cl.
 CPC ......... *F02M 35/108* (2013.01); *F02B 27/006* (2013.01); *F02M 35/10072* (2013.01);
    (Continued)

(58) Field of Classification Search
 CPC ............ F02M 35/108; F02M 35/10072; F02B 24/006
 See application file for complete search history.

(56) References Cited

U.S. PATENT DOCUMENTS 4,919,086 A    4/1990    Shillington
6,314,931 B1 *    11/2001    Yasuda ................... F02B 61/02
                    123/184.53
(Continued)

FOREIGN PATENT DOCUMENTS

DE    43 07 313 A1    9/1994
DE    102005022589    *    5/2006    .............. F02B 27/00
(Continued)

*Primary Examiner* — Kevin A Lathers
(74) *Attorney, Agent, or Firm* — Studebaker & Brackett PC

(57) ABSTRACT

An intake system of an engine includes an engine and an intake manifold. The intake manifold defines individual intake air passageways each connecting one of cylinders to a volume chamber. Each of the individual intake passageways includes a first route and a second route. The first route has a natural frequency, of an air column, synchronized with a first revolution higher than an engine revolution for maximum torque such that a dynamic supercharging effect is obtained at the first revolution. The second route has a natural frequency, of an air column, synchronized with a second revolution higher than the engine revolution for maximum torque such that a dynamic supercharging effect is obtained at the second revolution. The second revolution differs from the first revolution. A difference between the first and second revolutions is set lower than or equal to 15% of a maximum engine revolution.

5 Claims, 5 Drawing Sheets

(51) Int. Cl.
  *F02B 27/00* (2006.01)
  *F02M 35/10* (2006.01)
  *F02B 27/04* (2006.01)

(52) U.S. Cl.
  CPC ........ *F02B 27/04* (2013.01); *F02M 35/10078* (2013.01); *Y02T 10/14* (2013.01); *Y02T 10/146* (2013.01)

(56) References Cited

U.S. PATENT DOCUMENTS

| | | | | |
|---|---|---|---|---|
| 2001/0010213 A1* | 8/2001 | Umino | ................ | F02B 27/0284 123/184.53 |
| 2004/0187828 A1* | 9/2004 | Yasuda | ............ | F02M 35/10019 123/184.57 |
| 2015/0330515 A1* | 11/2015 | Oiwa | ................. | F02B 27/0215 251/314 |

FOREIGN PATENT DOCUMENTS

| | | |
|---|---|---|
| EP | 1 724 451 A2 | 11/2006 |
| JP | 2010-14079 A | 1/2010 |

\* cited by examiner

INTAKE SYSTEM OF ENGINE

CROSS-REFERENCE TO RELATED APPLICATION

This application claims priority to Japanese Patent Application No. 2014-211668 filed on Oct. 16, 2014, the entire disclosure of which is incorporated by reference herein.

BACKGROUND

The present disclosure relates to an intake system of an engine.

Japanese Unexamined Patent Application No. 2010-14079 discloses a control device of an internal-combustion engine, and an intake system (i.e., an intake manifold) controlled by the control device. This intake system includes individual intake passageways provided to respective cylinders. Each of the individual intake passageways branches upstream into a first intake passageway and a second intake passageway, and each of the first and second intake passageways communicates with a volume chamber in a surge tank. Meanwhile, the first and second intake passageways of each individual intake passageway converge downstream into one intake passageway. Each of the first and second intake passageways is configured to obtain a dynamic supercharging effect at a different engine revolution. Moreover, a variable valve is provided to a branching point of the first and second intake passageways. This control device continuously changes an opening of the variable valve, based on a running state of the engine, to achieve the dynamic supercharging effects and increase the volumetric efficiency between the vicinity of a first revolution in the middle speed range and the vicinity of a second revolution in the high speed range. Thus, the control device intends to obtain high engine torque.

SUMMARY

In the variable intake system disclosed in Japanese Unexamined Patent Application No. 2010-14079, a variable valve is provided within each individual intake passageway. Hence, the variable intake system has a disadvantage that its weight and manufacturing cost inevitably increase by the variable valves and its control systems.

However, if a communication is established between the volume chamber and the inside of each of the cylinders via a single individual intake passageway, the dynamic supercharging effect is obtained only at a specific engine revolution. Hence, a high engine torque is available only in a narrow speed range.

One of the requests to intake systems is to reduce their weights and manufacturing costs as well as to increase the volumetric efficiency at higher engine speed and obtain high engine torque over a wide speed range at high engine speed.

In view of the foregoing background, it is therefore an object of the present disclosure to provide an intake system, of an engine, which increases the volumetric efficiency at high engine speed, while reducing the weight and production cost of the intake system.

A technique disclosed here includes an engine including cylinders each communicating with an associated one of intake ports which are opened and closed by intake valves; and an intake manifold attached to a side portion of the engine, the intake manifold including: a surge tank defining a volume chamber; and individual runners having (i) upstream end portions connected to the surge tank, and (ii) downstream end portions connected to the intake ports, the individual runners defining individual intake passageways each connecting an associated one of the cylinders to the volume chamber.

Each of the individual intake passageways includes: a first route including (i) a first upstream passageway extending from the volume chamber, and (ii) a downstream passageway continuing from the first upstream passageway and connected to the one cylinder, the first route having a natural frequency, of an air column, which is synchronized with a first revolution higher than an engine revolution for maximum torque such that a dynamic supercharging effect is obtained at the first revolution; and a second route including (i) a second upstream passageway extending from the volume chamber and continuing to the downstream passageway, and (ii) the downstream passageway, the second route having a natural frequency, of an air column, which is synchronized with a second revolution higher than the engine revolution for maximum torque such that a dynamic supercharging effect is obtained at the second revolution, the second upstream passageway being different from the first upstream passageway, and the second revolution being different from the first revolution.

The first and second routes are always open regardless of a running state of the engine.

The first upstream passageway and the second upstream passageway communicate, respectively through a first opening and a second opening, with the volume chamber, the first and second openings being open on a side face of the surge tank farther from the engine.

The first and second openings are arranged in a direction of a cylinder axis of the engine.

Then, a difference between the first and second revolutions is set lower than or equal to 15% of a maximum engine revolution.

The "dynamic supercharging effect" here is to utilize a pressure wave which occurs when an intake valve opens, and propagates through the individual intake passageway to force the intake air into the cylinder and increase the volumetric efficiency. This dynamic supercharging effect is a so-called inertial supercharging effect which takes advantage of a pressure wave (i.e., a first pulsation) that shuttles once between the immediately upstream portion of the intake valve and the volume chamber.

In accordance with this configuration, the individual intake passageway includes the downstream passageway and one of the first upstream passageway or the second upstream passageway. The downstream passageway includes an intake port. In each of the individual intake passageways, the first route, including the first upstream passageway and the downstream passageway, is configured to obtain a dynamic supercharging effect at the first revolution, and the second route, including the second upstream passageway and the downstream passageway, is configured to obtain a dynamic supercharging effect at the second revolution. The first and second revolutions are higher than the engine revolution for maximum torque. Both the first and second routes are always open, regardless of a running state of the engine. Moreover, the first and second upstream passageways are connected in parallel with each other to the side face of the surge tank farther from the engine—that is, on the same side face of the surge tank.

The inventors of the present application have found out that in the intake system having the above configuration, the volumetric efficiency may be increased across a relatively wide speed range, at high engine speed above the engine revolution for maximum torque, including the first and second revolutions, if the difference between the first and second revolutions is lower than or equal to 15% of the maximum engine revolution.

Specifically, the difference between the first and second revolutions is relatively small if the difference is set within the 15-percent range. The small difference causes (i) a natural frequency, of an air column, for the pressure wave propagating through the first route and (ii) a natural frequency, of an air column, for the pressure wave propagating through the second route to relatively come close to each other. Hence, the relatively close natural frequencies enable reducing an adverse effect due to the interference between the pressure waves propagating through the respective routes, and the dynamic supercharging effects caused by both the pressure waves are effectively achieved. Furthermore, each of the individual intake passageways includes two passageways upstream. This increases the cross-section area of the passageways and reduces the pressure loss of the intake air. Consequently, the volumetric efficiency may be increased across a relatively wide speed range, at high engine speed above the engine revolution for maximum torque, including the first and second revolutions. As a result, the torque of the engine may increase across a relatively wide speed range at high engine speed.

Furthermore, the intake system allows the first and second upstream passageways to be always open, regardless of a running state of the engine, and thus eliminates the need for a member equivalent to a variable valve, unlike a typical variable intake system. Hence, the weight and manufacturing costs of the intake system may be reduced for the eliminated member and control system of the member.

A typical variable intake system intends to increase the volumetric efficiency across a relatively wide speed range ranging from low speed range to high speed range, by relatively increasing the difference between revolutions at which the dynamic supercharging effects are obtained with each of two passageways, and by opening and closing one of the passageways with a variable valve. The intake system according to present configuration, however, intends to increase the volumetric efficiency across a wide speed range at high engine speed by relatively decreasing the difference between revolutions at which dynamic supercharging effects are obtained at high engine speed, and by always opening, not opening and closing, the first and second routes.

Furthermore, the first and second upstream passageways are connected to the same side face of the surge tank. This enables relatively decreasing the difference in length between the first and second routes. This configuration is advantageous in reducing the difference between the first and second revolutions that may achieve the dynamic supercharging effects.

Moreover, the opening ends of the first and second upstream passageways are connected to one side of the volume chamber. This is advantageous in running the intake airflows, which have entered the first upstream passageway and the second upstream passageway from the volume chamber, in the same direction. This enables smoothly meeting the intake airflows running through the passageways.

Furthermore, a difference D and a diameter R may satisfy a relationship of $1<D/R\leq2$ where the diameter R is a diameter of a true circle which corresponds to a cross-section area of the downstream passageway, and the difference D is a difference in length between the first and second routes.

The inventor of the present application have found out that, if the difference D in length between the first route and the second route and the diameter R of the downstream passageway satisfy the relationship ($1<D/R\leq2$), the difference between the first revolution and the second revolution becomes relatively small, and, as seen before, the torque increases in a speed range above the engine revolution for maximum torque. This expression of the relationship means that the first and second revolutions, where the dynamic supercharging effect is obtained, are relatively close to each other (i.e., an upper limit), and that the first and second upstream passageways may be arranged without interfering with each other (i.e., a lower limit).

Moreover, the diameter R may be a diameter of a true circle which corresponds to a smallest cross-section area for each of the individual runners that defines the downstream passageway.

When the diameter R selected in this manner satisfies the relationship, the resulting intake system to be obtained may be suitable to achieve the above effects.

Furthermore, each of the first and second upstream passageways is configured to extend, from the side face of the surge tank farther from the engine, in a direction away from the engine, and then to connect to the downstream passageway.

This configuration is further advantageous in running, in the same direction, the intake airflows that have entered the first upstream passageway and the second upstream passageway from the surge tank. Consequently, the configuration enables smoothly meeting the intake airflows that have passed through respective passageways.

DETAILED DESCRIPTION

An embodiment of an intake system of an engine will now be described, with reference to the drawings. The preferred embodiment below is essentially just an example.

An engine 10 according to this embodiment is a spark-ignition engine. Attached to sides of the engine 10 are an intake manifold 20 included in an intake system 2, and an exhaust manifold 40.

Figure 1:
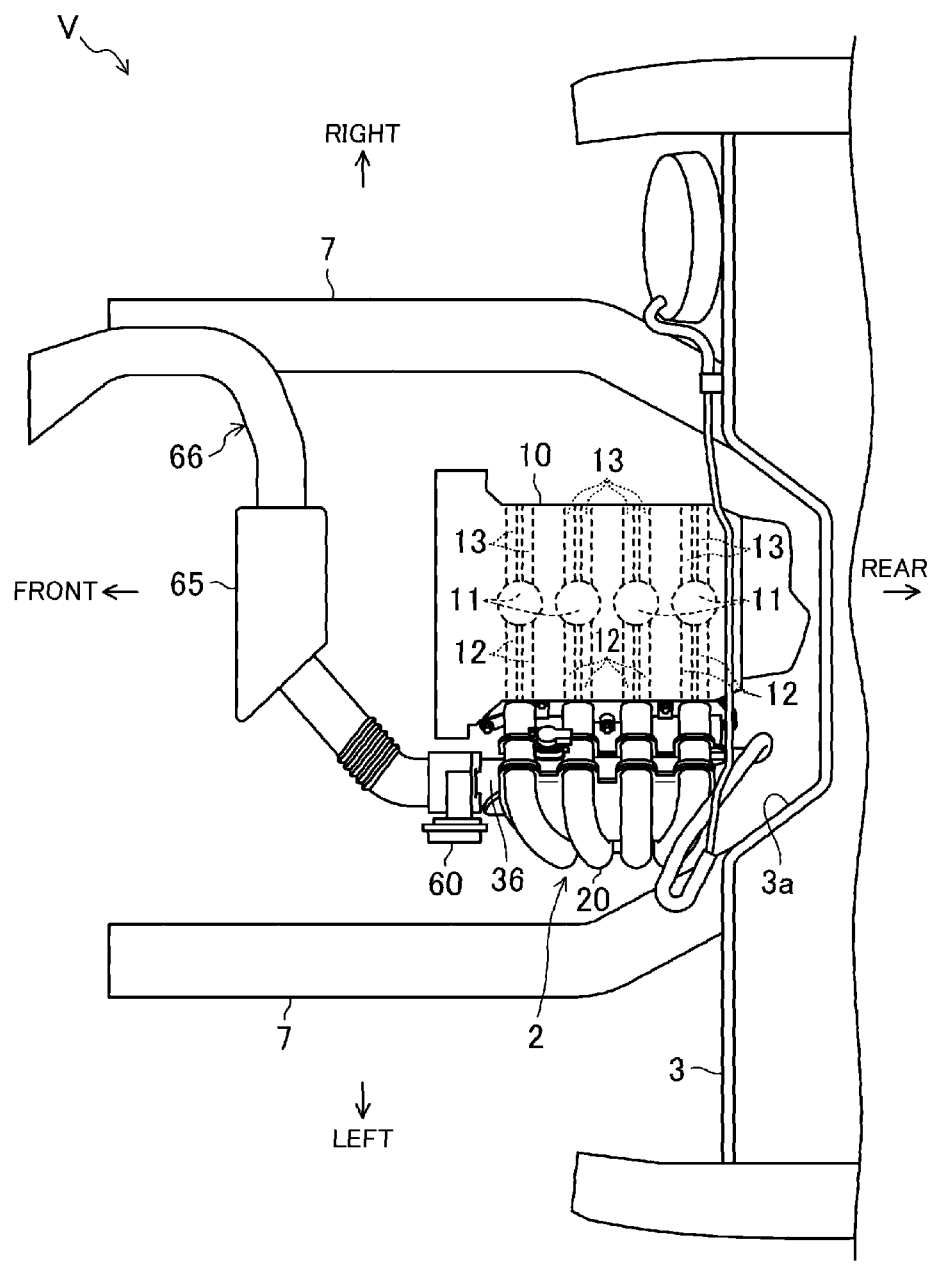
FIG. 1 is a plan view generally illustrating how an engine equipped with an intake system according to an embodiment is mounted on a vehicle.

FIG. 1 illustrates how the engine 10 with the intake manifold 20 attached is mounted on a vehicle V. In this embodiment, the engine 10 is longitudinally mounted in the engine compartment in the front of the vehicle V (i.e., between right and left front side frames 7 extending in the front-rear direction of the vehicle). In the engine compartment, the engine 10 is located in front of a tunnel portion (i.e., a portion below a depression 3a) provided below the center portion, of a dash panel 3, in the vehicle width direction. Note that the vehicle V has a front-engine, rear-wheel-drive (FR) layout.

In this embodiment, the engine 10 is a four-cylinder in-line engine. Four cylinders 11 are arranged in line in the front-rear direction of the vehicle. Specifically, as illustrated in FIG. 1, the engine 10 includes, in the order from the front (i.e., on the observer's left in FIG. 1), a first cylinder 11, a second cylinder 11, a third cylinder 11, and a fourth cylinder 11. Hereinafter, unless the circumstances are exceptional, the configuration of the third cylinder 11, which is illustrated in a cross-sectional view in FIG. 3, out of the four cylinders 11 is specifically described, and this third cylinder 11 is simply referred to as "the cylinder 11". The other cylinders are the same in configuration as the third cylinder 11. The intake manifold 20, made of resin, is fastened to the left side face of the engine 10 with respect to the vehicle. Meanwhile, the after-described exhaust manifold 40 (omitted in FIG. 1) is fastened to the right side face of the engine 10 with respect to the vehicle.

Specifically, the engine 10 has a cylinder block (not shown) provided with the four cylinders 11, and a cylinder head 17 (see FIG. 3) placed on this cylinder block. Each of the cylinders 11 in the engine 10 has a piston (not shown) reciprocably inserted therein. This piston is connected to the crankshaft via a con rod (not shown).

For each of the cylinders 11, the cylinder head 17 has (i) two intake ports 12 and two exhaust ports 13, and (ii) intake valves 14 and exhaust valves (not shown) arranged to the respective intake ports 12 and exhaust ports 13. The intake valves 14 and the exhaust valves open and close the openings, of these intake ports 12 and exhaust ports 13, to the cylinder 11. The intake valves 14 are driven by an intake valve driving mechanism, and the exhaust valves are driven by an exhaust valve driving mechanism.

When the engine 10 operates, an intake stroke, a compression stroke, a power stroke, and an exhaust stroke are each executed at a different time point for each cylinder 11. In this embodiment, the strokes are executed in the order of the first cylinder 11, the third cylinder 11, the fourth cylinder 11, and the second cylinder 11.

The intake manifold 20 of the engine 10 having the above configuration includes a surge tank 22. An intake-air introducing passageway 36 extends from a top portion of the surge tank 22 toward the front of the vehicle. Provided to a tip portion (i.e., at an end portion to the front of the vehicle) of the intake air introducing passageway 36 is a throttle body 60 having a throttle valve. This throttle body 60 is connected to a duct 66 coupled to the intake and extending from a front-end portion of the vehicle V toward its rear. An air cleaner 65 is provided at a point of the duct 66. Thus, the intake air, sucked into the duct 66, is to pass through the passageway defined by the throttle body 60 and the intake-air introducing passageway 36, and to be introduced to the surge tank 22.

Figure 2:
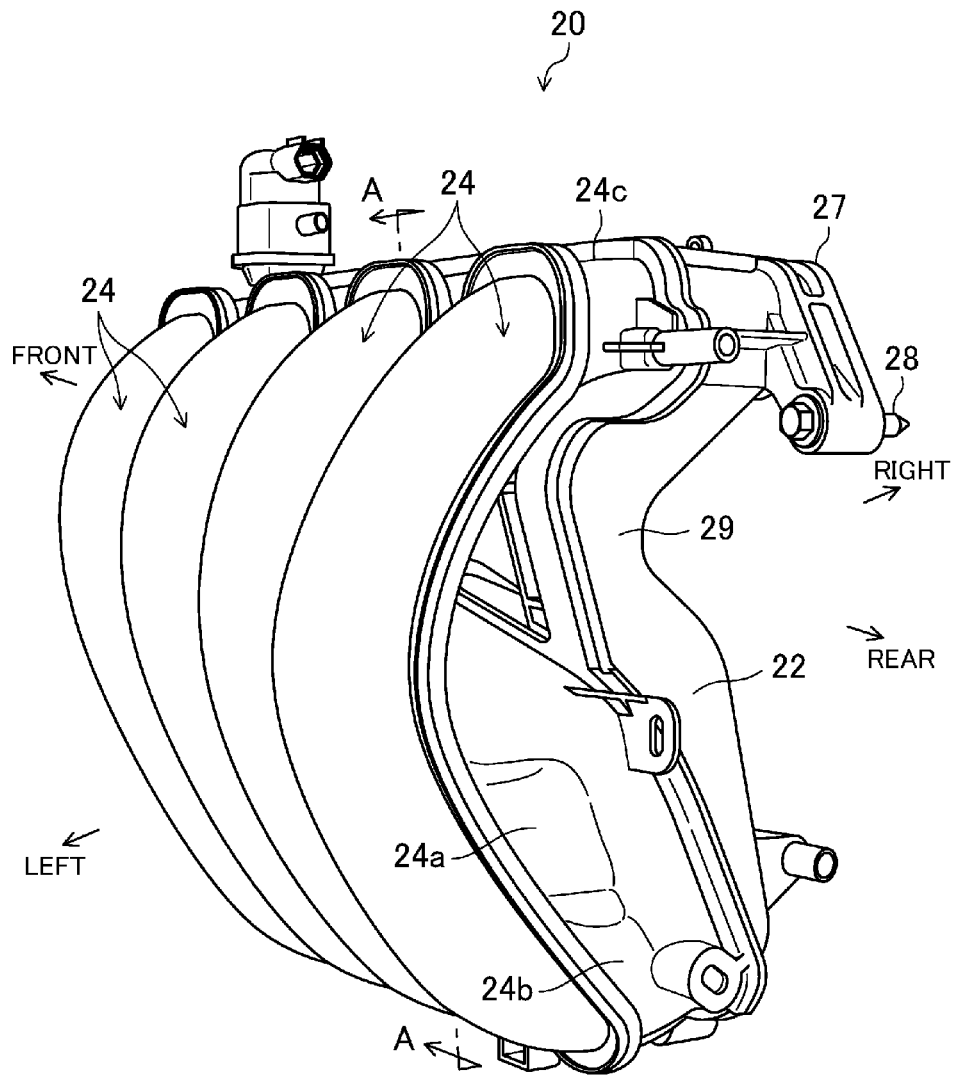
FIG. 2 is a perspective view from the left rear of the vehicle, illustrating an intake manifold included in the intake system.
Figure 3:
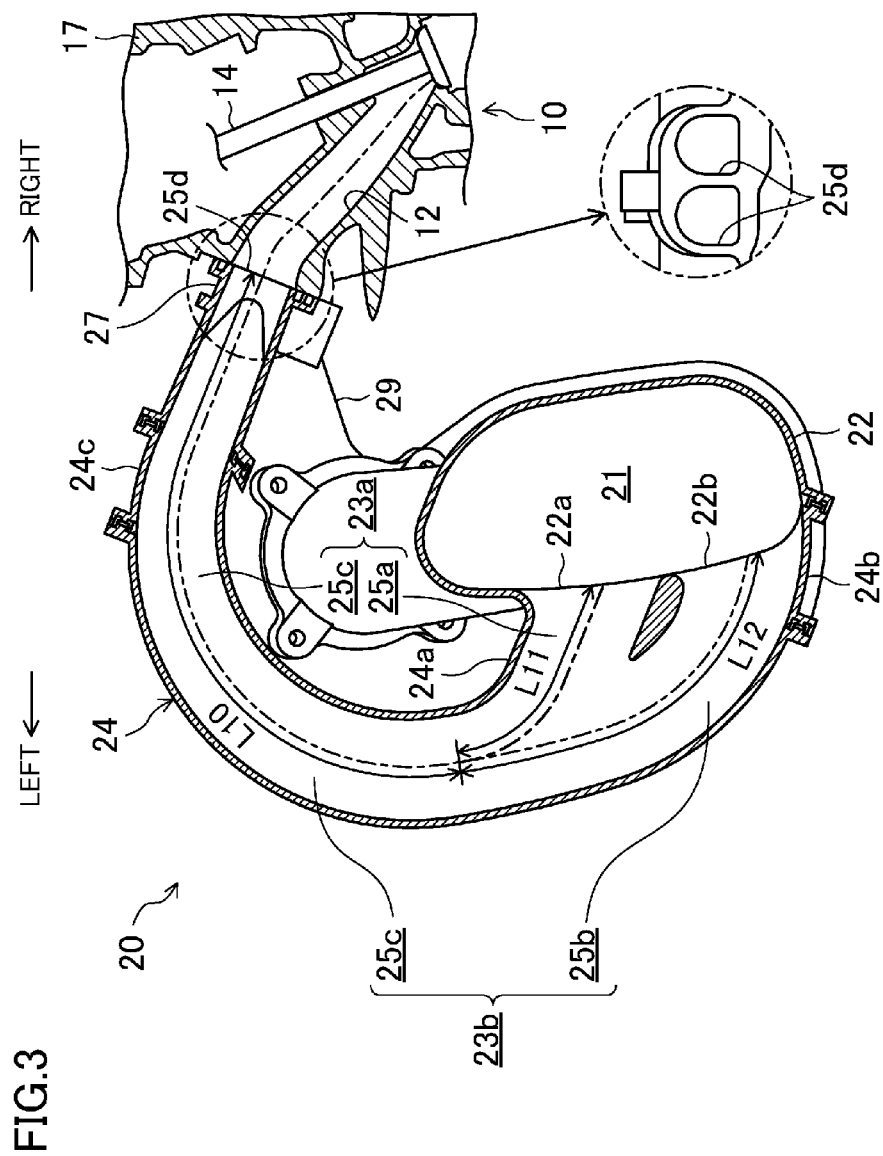
FIG. 3 is a general view illustrating a vertical section of the intake manifold attached to the engine.

FIG. 2 illustrates an appearance of the intake manifold 20, and FIG. 3 illustrates a cross-sectional view, taken from the line A-A (see the arrow A in FIG. 2), of the intake manifold 20 attached to the engine 10. Specifically, FIG. 3 is a cross-sectional view which longitudinally cuts the third cylinder 11. Note that, for the intake manifold 20 described below, the terms front, rear, right, left, top, and bottom are those used when the intake manifold 20 is mounted on the vehicle V. The terms are the same as those for the vehicle V.

Here, the "upstream" and "downstream" are defined based on the direction of an airflow when the engine 10 is in operation.

The intake manifold 20 includes the surge tank 22 which defines a volume chamber 21. As illustrated in FIG. 3, this volume chamber 21 is partitioned off, by an inner wall of the surge tank 22, as a space which is extending in the front-rear direction and shaped into an approximate rectangle.

With the intake manifold 20 according to this embodiment fastened to the engine 10, the intake air introduced to the volume chamber 21 passes through four individual intake passageways 23 and the intake ports 12, and then flows into the cylinders 11. Here, each of the four individual intake passageways 23 separately provides communication between the inside of an associated one of the four cylinders 11 and this volume chamber 21.

Hence, the intake manifold 20 is equipped with four individual runners 24 including respective individual intake passageways 23 each provided for an associated one of the cylinders 11 of the engine 10.

The four individual runners 24 are arranged in the front-rear direction, and each associated with one of the cylinders 11. An upstream end portion of each individual runner 24 is connected to the left side face of the surge tank 22. Moreover, an opening end 25d is provided to a downstream end portion of each individual runner 24. Provided in the vicinity of the opening end 25d is a fastener 27 connectable to the engine 10.

As described below, each of the four individual runners 24 defines: a first upstream passageway 25a which extends from the volume chamber 21; a second upstream passageway 25b which extends, aside from the first upstream passageway 25a, from the volume chamber 21, and joins the first upstream passageway 25a; and a downstream passageway 25c which continuously extends from the first and second upstream passageways 25a and 25b to the opening end 25d. In other words, each of the four individual intake passageways 23 branches upstream into two routes: a first route 23a including the first upstream passageway 25a and the downstream passageway 25c; and a second route 23b including the second upstream passageway 25b and the downstream passageway 25c.

Specifically, the four individual runners 24 are arranged in the front-rear direction, and extend in a curve from the left side face of the surge tank 22 toward the top right to cover the top of the surge tank 22. Because of this configuration, as illustrated in FIG. 3, the individual runners 24 have a vertical section in an approximate C shape, and extend from the left toward the top of the surge tank 22 so as to cover the surge tank 22.

Then, each of the individual runners 24 has two pipes, namely, a first upstream pipe 24a and a second upstream pipe 24b. The first and second upstream pipes 24a and 24b extend in a curve, at and in the vicinity of the upstream end portion, from the left side face of the surge tank 22 toward the left top. In this embodiment, the first upstream pipe 24a is located above the second upstream pipe 24b. Both the pipes 24a and 24b are formed into an approximately bent pipe, vertically arranged, and connected to the surge tank 22. The pipe 24a defines the first upstream passageway 25a, and the pipe 24b defines the second upstream passageway 25b.

Note that a connecting portion, between the left side face of the surge tank 22 and the first and second upstream pipes 24a and 24b, is provided with a first opening 22a and a second opening 22b for each of the individual runners 24. These first opening 22a and second opening 22b are arranged in the vertical direction of the engine (i.e., in the direction of a cylinder axis of the engine). The first upstream passageway 25a and the second upstream passageway 25b respectively have the first opening 22a and the second opening 22b as the upstream ends, and are connected to, and communicate with, the volume chamber 21.

As described above, the intake manifold 20 is attached to a left side face of the engine 10 with respect to the vehicle. Hence, in the intake manifold 20 attached to the engine 10, both the first and second openings 22a and 22b that open on the left of the surge tank 22 are to be provided to the side face of the surge tank 22 farther from the engine (i.e., a face located apart from the engine 10). Thus, both the first and second upstream pipes 24a and 24b connected to the same side face are to extend in a direction away from the engine 10 at and in the vicinity of the upstream end portions. Hence, the first and second upstream passageways 25a and 25b extend in a direction away from the engine 10, and then connect to the downstream passageway 25c.

As illustrated in FIG. 3, both the first and second upstream pipes 24a and 24b extend in a curve from the left side face toward the left top of the surge tank 22, and then meet at approximate left of the surge tank 22. A part between a meeting portion of the first and second upstream pipes 24a and 24b and the downstream end portion at the individual runner 24 is configured to be the downstream pipe 24c for each cylinder 11. This downstream pipe 24c, which defines the downstream passageway 25c, is formed into a single bent pipe extending in an approximately circular arc so as to run in a curve over the top of the surge tank 22 toward its right. The downstream pipe 24c is connected to the intake ports 12 of the engine 10 via the fastener 27.

As illustrated in FIG. 3, the second opening 22b is provided below the first opening 22a. Hence, the second upstream passageway 25b that extends from the second opening 22b is to extend below the first upstream passageway 25a that extends from the first opening 22a. As a result, a length L12 of the second upstream passageway 25b (i.e., the length L12 between the second opening 22b and the meeting portion to the first upstream passageway 25a) is longer than a length L11 of the first upstream passageway 25a (i.e., the length L11 between the first opening 22a and the meeting portion to the second upstream passageway 25b) by the length that extends upward farther than the first upstream passageway 25a (i.e., L12>L11).

Furthermore, the fastener 27 is located at and in the vicinity of the downstream end portion of each downstream pipe 24c. The fastener 27, extending in the front-rear direction, is used for fastening the intake manifold 20 to the cylinder head 17 of the engine 10. This fastener 27 is located above and away from the surge tank 22. An end portion, of the fastener 27, close to the engine (i.e., on the right) is secured with a bolt 28 on the left side face of the cylinder head 17 of the engine 10.

Moreover, as illustrated in FIGS. 2 and 3, lower portions of the downstream pipe 24c and the fastener 27 and an upper portion of the surge tank 22 are integrally connected to one another by a bridge 29 extending in the vertical direction.

When the fastener 27 is secured on the left side face of the cylinder head 17 of the engine 10, the downstream passageway 25c for each individual runner 24 and the intake ports 12 provided to the cylinder head 17 for each cylinder 11 are connected and communicate with each other. As described above, two intake ports 12 are provided to each cylinder 11. A two-dot chain line circle of FIG. 3 shows that, for each downstream passageway 25c, the opening end 25d to be connected to the intake ports 12 is separated into two to match the two intake ports 12.

The first upstream passageway 25a, the second upstream passageway 25b, and the downstream passageway 25c defined by each individual runner 24, and the intake ports 12 of the engine 10 configure an individual intake passageway 23. Each of four individual intake passageways 23 separately provides communication between the inside of an associated one of four cylinders 11 and the volume chamber 21.

Each of the individual intake passageways 23 includes: the first route 23a having the first upstream passageway 25a, the downstream passageway 25c, and the intake ports 12; and the second route 23b having the second upstream passageway 25b, the downstream passageway 25c, and the intake ports 12.

Hence, when the engine 10 with the intake manifold 20 attached is driven, the intake air introduced to the volume chamber 21 is to sequentially pass one of the first route 23a or the second route 23b and each intake port 12, in response to the opening and closing of the intake valves 14 of each cylinder 11. Then, the intake air is to be guided into each cylinder 11 as shown by the one-dot chain line illustrated in FIG. 3.

Moreover, in contrast to a typical variable intake system, the intake manifold 20 is not provided with a variable valve. Both the first and second routes 23a and 23b are always open regardless of a running state of the engine 10.

Note that, as described above, the first and second upstream passageways 25a and 25b extend in approximately parallel with each other in the vicinity of the first and second openings 22a and 22b. Thus, the intake airflows that have just entered the first and second upstream passageways 25a and 25b from the volume chamber 21 are to run in approximately parallel with each other.

Furthermore, as described above, the second upstream passageway 25b extends upward farther than the first upstream passageway 25a. Thus, a length L2 (i.e., L12+L10) of the second route 23b, that includes the second upstream passageway 25b and the downstream passageway 25c, extends farther than a length L1 (i.e., L11+L10) of the first route 23a that includes the first upstream passageway 25a and the downstream passageway 25c. Hereinafter, the difference in length between the second route 23b and the first route 23a is denoted by D (i.e., L2−L1=L12−L11>0). Note that, in each individual intake passageway 23, the intake ports 12 are shared with the first and second routes 23a and 23b. Hence, the length of each intake port 12 is excluded when the difference in length between the routes is calculated.

Moreover, the first upstream passageway 25a and the second upstream passageway 25b have approximately the same cross-section area in the vicinity of a portion communicating with the volume chamber 21. Meanwhile, the downstream passageway 25c generally has approximately the same the cross-section area as those of the first and second upstream passageways 25a and 25b. However, the downstream passageway 25c is configured to have a smaller cross-section area than those of the first and second upstream passageways 25a and 25b in the vicinity of the fastener 27. The cross-section area of the downstream passageway 25c—that is, the cross-section area S of a region surrounded by the inner wall of the downstream pipe 24c— is smallest at the opening end 25d. Hereinafter, S is the cross-section area of the downstream passageway 25c at the opening end 25d. As described above, the opening end 25d is separated into two. Hence, the cross-section area S here is the sum of the cross-section areas of the two opening ends 25d that have been separated into.

Hereinafter, the diameter R of the cross-section area is utilized as an amount to characterize the size of the cross-section area of each individual intake passageway 23. In this embodiment, the diameter of a true circle which corresponds to the cross-section area S—that is, the diameter of a true circle of which area is the same as the sum of the cross-section areas of the opening ends 25d—is defined as the diameter R. Specifically, the diameter R of the opening end 25d of the downstream passageway 25c is obtained by the following expression: $S=\pi \cdot (R/2) \cdot (R/2)$ where $\pi$ is the circumference ratio.

The first route 23a and the second route 23b according to this embodiment are different in length. Due to this difference, each of the routes is configured to achieve a dynamic supercharging effect (i.e., mainly an inertial supercharging effect, but including a resonance supercharging effect) at a different engine revolution.

Studied here is a dynamic supercharging effect obtained from the first route 23a. A pressure wave generated along with the opening operation of the intake valves 14 propagates through the first route 23a and shuttles between the immediately upstream portions of the intake valves 14 for the intake ports 12 and the volume chamber 21. The engine 10 and its intake manifold 20 according to this embodiment force the intake air to flow into a cylinder 11 by causing the pressure wave, generated when the intake valves 14 open, to shuttle once to come back to the immediately upstream portion of the intake valves 14 (i.e., by a first pulsation) before the intake valves 14 are closed. This enables increasing the volumetric efficiency, and, as a result, the torque of the engine 10 increases. Such a dynamic supercharging effect is to be obtained when the engine 10 runs at a predetermined revolution determined based on a form of the intake manifold 20.

When the engine 10 runs at a predetermined first revolution V1, the first route 23a is configured to have a natural frequency, of the air column, which is synchronized with the first revolution V1, such that the dynamic supercharging effect is provided to the cylinder 11 connected to and communicating with the first route 23a. This first revolution V1 is determined based on, for example, the forms of the surge tank 22 and the first route 23a. In this embodiment, the first revolution V1 is set higher than the engine revolution Vt (i.e., Vt<V1) (hereinafter referred to as the engine revolution for maximum torque) that allows the engine 10 to generate the maximum torque.

When the engine 10 runs at a predetermined second revolution V2, the second route 23b is also configured to have a natural frequency, of the air column, which is synchronized with the second revolution V2, such that the dynamic supercharging effect is provided to the cylinder 11 connected to and communicating with the second route 23b. This second revolution V2 is determined based on, for example, the forms of the surge tank 22 and the second route 23b. In this embodiment, the second revolution V2 is set higher than the engine revolution Vt for maximum torque and lower than the first revolution V1 (i.e., Vt<V2<V1). A revolution difference Vd between the first and second revolutions V1 and V2 is determined based on the difference in form between the first and second routes 23a and 23b. The second route 23b includes not the first upstream passageway 25a but the second upstream passageway 25b, and is longer than the first route 23a. Hence, the engine revolution to achieve the dynamic supercharging effect is low for the second route 23b.

Note that, in this embodiment, the engine revolution Vt for maximum torque is approximately in the middle of the engine revolution range set for the engine 10.

Here, the intake manifold 20 is configured such that the revolution difference Vd is set lower than or equal to 15% of the upper limit of the engine revolution Ve (hereinafter referred to as the maximum engine revolution) set for the engine 10. Specifically, the intake manifold 20 is configured to satisfy the relationship of "Vd/Ve=(V1−V2)/Ve≤0.15" (hereinafter referred to as Expression F). This means that the engine revolution V1, where the dynamic supercharging effect is obtained by the first route 23a, and the engine revolution V2, where the dynamic supercharging effect is obtained by the second route 23b, are relatively close to each other. As described above, the first opening 22a of the first upstream passageway 25a that defines the first route 23a and the second opening 22b of the second upstream passageway 25b that defines the second route 23b are arranged, on the same side face of the surge tank 22 farther from the engine, in parallel with each other in the direction of the cylinder axis. Hence, the difference D between the length L1 of the first route 23a and the length L2 of the second route 23b becomes relatively small. By the decrease in the difference D, the first revolution V1, where the dynamic supercharging effect is achieved by the first route 23a, and the second revolution V2, where the dynamic supercharging effect is achieved by the second route 23b, come close to each other, and the resulting revolution difference Vd becomes smaller. Furthermore, the intake manifold 20 may be configured, such that the difference D between the first and second routes 23a and 23b and the diameter R of the opening end 25d satisfy the relationship of "1<D/R≤2" (hereinafter referred to as Expression G). Specifically, D/R is greater as the difference in length between the routes is larger; however, since D/R is smaller than or equal to 2, the difference in length between the routes becomes relatively small, and so does the revolution difference Vd. As can be seen, a relatively small difference between the first revolution V1 and the second revolution V2 enables increasing the volumetric efficiency across a relatively wide speed range at high engine speed above the engine revolution Vt for maximum torque. The details will be described later.

Furthermore, in a speed range at low engine speed below the engine revolution for maximum torque—that is, the speed range in which the time periods for opening and closing of the intake valves 14 are relatively long—, pressure waves (i.e., a second pulsation and a third pulsation) which shuttle twice or more through the first route 23a or the second route 23b are utilized to increase the volumetric efficiency.

Hence, at high engine speed above the engine revolution Vt for maximum torque, the torque of the engine 10 is increased using the dynamic supercharging effect obtained by the first and second routes 23a and 23b that are always open in the intake manifold 20. Meanwhile, in the middle speed range including the engine revolution Vt for maximum torque, the torque of the engine 10 is increased through the encouragement of the scavenging in each cylinder 11 by the exhaust manifold 40 having a so-called "4-2-1 pipe layout".

Figure 4:
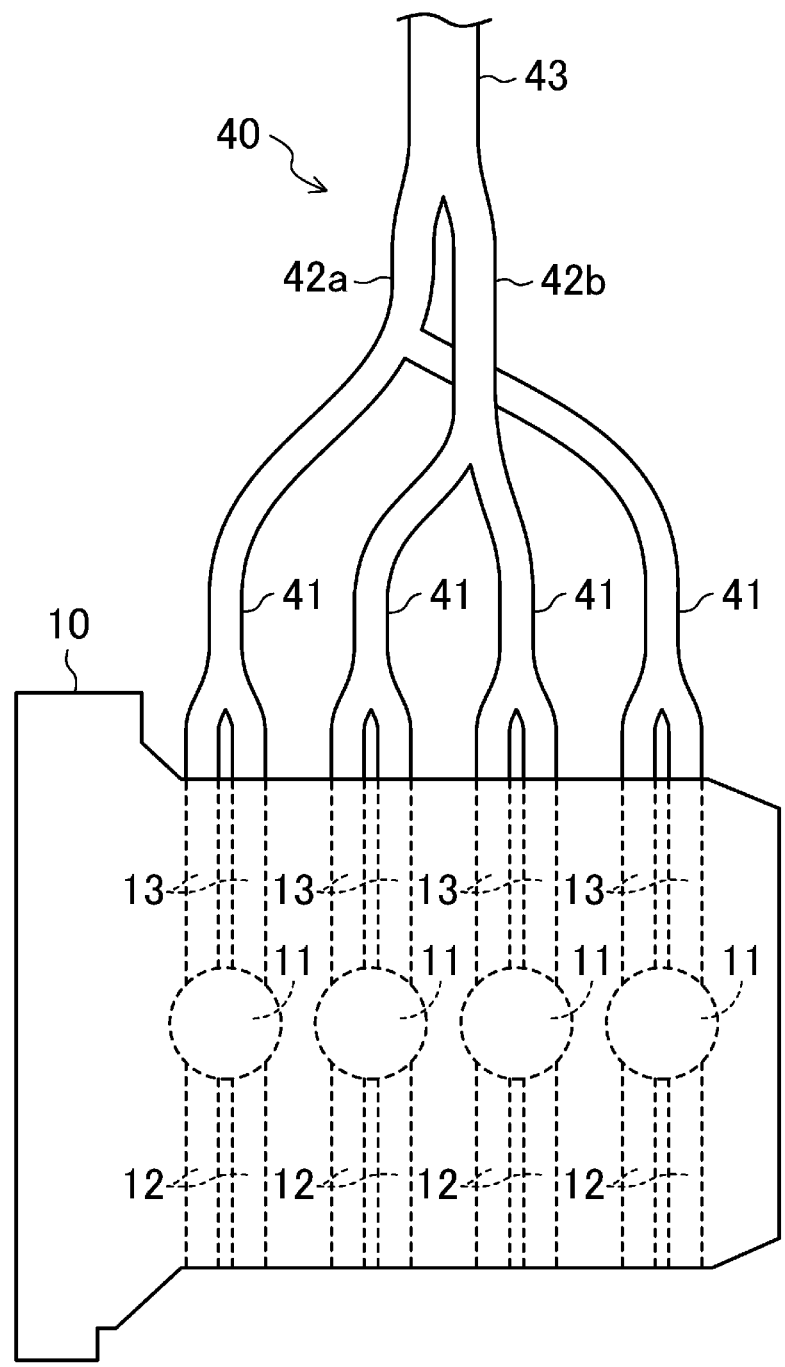
FIG. 4 is a plan view generally illustrating an exhaust manifold of the engine.

FIG. 4 generally illustrates a configuration of the exhaust manifold 40 according to this embodiment. This exhaust manifold 40 includes four individual exhaust pipes 41 connected to the respective cylinders 11.

In a similar manner to the four individual runners 24, each of the individual exhaust pipes 41 has an end portion which branches into two and is connected to the engine 10. Each of the end portions that is branched into is connected to an associated one of two exhaust ports 13 which are provided to each cylinder 11.

As can be seen, the exhaust manifold 40 has the 4-2-1 pipe layout. Specifically, in this embodiment, the four individual exhaust pipes 41 are collected downstream into pairs, such that the collected individual exhaust pipes 41 are not neighboring one another in the exhausting order of the cylinders 11 connected to respective individual exhaust pipes 41. Then, the collected pairs are further collected downstream into one pipe. In this embodiment, the exhaust gas is exhausted in the order of the first cylinder 11, the third cylinder 11, the fourth cylinder 11, and the second cylinder 11. Hence, the exhaust manifold 40 includes: a first collector 42a into which the individual exhaust pipes 41 for the first and fourth cylinders 11 are collected; a second collector 42b into which the individual exhaust pipes 41 for the second and third cylinders 11 are collected; and an exhaust connecting duct 43 which is provided downstream of the first and second collectors 42a and 42b, and into which the first and second collectors 42a and 42b are collected.

The application of the exhaust manifold 40 with this configuration to the engine 10 allows for reducing an adverse effect caused by the exhaust interference among the cylinders 11, and extracting exhaust gas from the cylinders 11 to increase a scavenging effect. Without going into detail, such effects are obtained when the engine revolution is in the middle speed range. An increase in the scavenging effect in the cylinders, and the sufficient introduction of fresh air in the cylinders by the increased scavenging effect, achieve higher engine torque in the middle speed range.

Described next is torque to be generated by the engine 10 equipped with the intake system 2 according to this embodiment (i.e., the engine 10 with the intake manifold 20 attached), with reference to FIG. 5.

Figure 5:
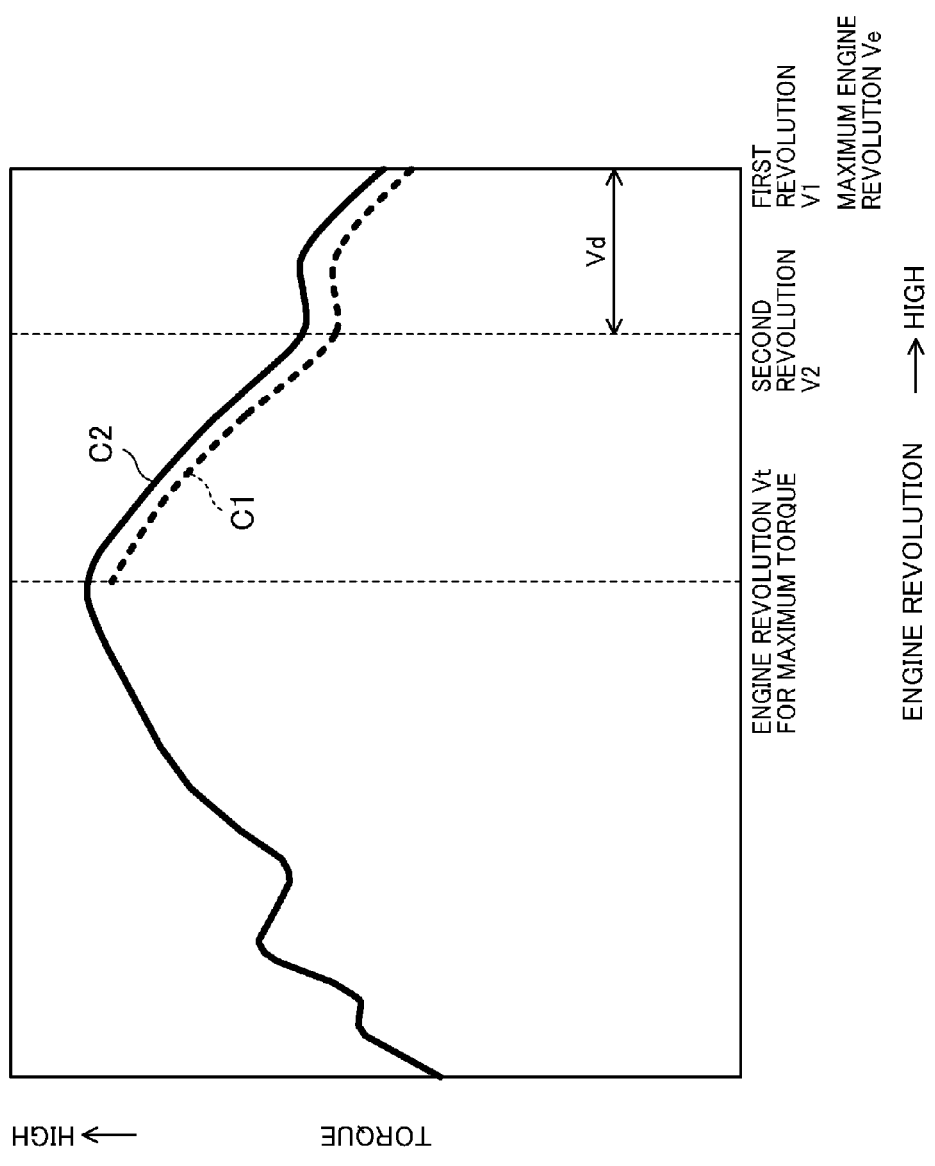
FIG. 5 is a graph illustrating a comparison between engine torque generated when the intake manifold according to the embodiment is used and other engine torque generated when an intake manifold according to a typical configuration is used.

FIG. 5 is a graph illustrating a relationship between an engine revolution and torque to be generated by the engine 10. In FIG. 5, a curve C2 illustrated by a solid line shows torque to be generated when the intake manifold 20 according to this embodiment is used. The intake manifold 20 is configured to obtain a dynamic supercharging effect at each of the first and second revolutions V1 and V2. Specifically, the engine 10 is a gasoline engine having a displacement of 1.5 L. The difference D between the first and second routes 23a and 23b is 53 mm. The diameter R of the opening end 25d is 36 mm. D/R is 1.47. Moreover, the engine 10 has the maximum engine revolution of 7000 rpm, and the engine revolution for maximum torque of approximately 4000 rpm, the first revolution V1 of 7000 rpm, and the second revolution V2 of 6000 rpm. Hence, the highest engine revolution Ve is 7000 rpm, the revolution difference Vd between the first and second revolutions V1 and V2 is 1000 rpm, and Vd/Ve is 0.143 (≈0.15). As shown by the curve C2 in FIG. 5, the torque to be generated with the use of the intake manifold 20 according to this embodiment generally increases from the observer's left to right (i.e., as the engine speed increases). Then, the torque becomes maximum at the engine revolution Vt for maximum torque shown at the horizontally middle of the graph. To the right of the engine revolution Vt for maximum torque—that is, to higher engine speed than the engine revolution Vt for maximum torque—, the torque generally decreases.

Meanwhile, in FIG. 5, a curve C1 illustrated by a dashed line shows torque to be generated when a typical intake system is used (i.e., a typical intake manifold is attached). This "typical intake manifold" includes a single passageway, and is configured to obtain a dynamic supercharging effect at the first revolution V1. This curve C1 shows that, at an engine speed higher than the engine revolution Vt for maximum torque, the torque to be generated when the typical intake manifold is used is below the torque generated when the intake manifold 20 according to this embodiment is used.

Specifically, the comparison between the intake manifold 20 according to this embodiment and the typical intake manifold shows that the torque obtained through the intake manifold 20 is higher than that obtained through the typical intake manifold not only approximately at the second revolution V2 but also across the entire range of engine speed higher than the maximum torque Vt. Described below are likely reasons of these effects.

Specifically, both the first revolution V1 for the pressure wave propagating through the first route 23a and second revolution V2 for the pressure wave propagating through the second route 23b are set to be higher than the engine revolution Vt for maximum torque, and the difference Vd is relatively small. This causes the natural frequencies of the air columns for the respective revolutions to come relatively close to each other. Hence, the interference is reduced between the pressure waves propagating through the first and second routes 23a and 23b, and the dynamic supercharging effects by both the routes are effectively achieved. As a result, the volumetric efficiency of the engine 10 increases across a relatively wide speed range including the first and second revolutions V1 and V2, and so does the torque.

Furthermore, in the intake manifold 20 according to this embodiment, each of the individual intake passageways 23 includes two passageways upstream; namely, the first and second upstream passageways 25a and 25b. Hence, the cross-section area of the individual intake passageway 23 is larger than that of the typical intake manifold including one passageway. Since the flow resistance decreases by the increase in the cross-section area, the pressure loss of the intake air reduces in the intake manifold 20 according to this embodiment. This is also a likely reason why the torque of the engine 10 increases.

As can be seen, the intake manifold 20 according to this embodiment successfully increases the volumetric efficiency across a relatively wide speed range at high engine speed to obtain higher torque.

Expression F is determined as a condition in which the natural frequencies of the air columns for the pressure waves propagating through the first and second routes 23a and 23b come close to each other to sufficiently reduce the adverse effect by the interference. Hence, as far as Expression F holds, the torque successfully increases across a relatively wide range at high engine speed. Note that (V1−V2)/Ve is greater than or equal to 0.

Moreover, the first and second routes 23a and 23b have no variable valve and are always open. As a result, the intake manifold 20 includes fewer parts for the valve and the system for the valve, and for the fewer parts, the weight and manufacturing costs of the intake manifold 20 are successfully reduced.

Furthermore, since each of the first and second upstream passageways 25a and 25b is connected to the same side face of the surge tank 22, the difference D between the length L1 of the first route 23a and the length L2 of the second route 23b is successfully reduced. This enables decreasing the difference Vd between the first and second revolutions V1 and V2.

In addition, the first and second openings 22a and 22b are arranged in parallel with each other on the side face of the volume chamber 21 farther from the engine. This is advantageous in running the intake airflows in the same direction from the volume chamber 21 into the first upstream passageway 25a and the second upstream passageway 25b. This enables smoothly meeting the intake airflows running through the passageways.

Furthermore, Expression G is determined by two conditions; namely, a condition in which the first and second openings 22a and 22b may be arranged not to interfere with each other (i.e., the lower end), and the other condition in which the frequencies of the pressure waves propagating through the first and second routes 23a and 23b come close to each other (i.e., an upper limit) such that the adverse effect by the interference may be sufficiently reduced (i.e., the upper end).

Moreover, the use of the pressure wave which shuttles through the first route 23a or the second route 23b twice or more successfully increases the volumetric efficiency even in the speed range at low engine speed below the engine revolution Vt for maximum torque,—that is, the speed range in which the time periods for opening and closing of the intake valves 14 are relatively long. As a result, the torque of the engine 10 is successfully increased.

In addition, the exhaust system has the 4-2-1 pipe layout, which further increases the torque in the middle speed range.

Moreover, the passageway width of the opening end 25d for the downstream passageway 25c is used as the diameter R to be used for Expression G. This allows the intake manifold 20 to be suitable to achieve the above effects.

The first and second upstream passageways 25a and 25b are configured to extend, from the side face of the surge tank 22, in the direction away from the engine 10, and then connect to the downstream passageway 25c. Thus, this configuration is further advantageous in running the intake airflows, which have just entered from the volume chamber 21 into the first and second upstream passageways 25a and 25b, in the same direction. Consequently, the intake airflows passing through respective passageways may meet smoothly.

Another Embodiment

In this embodiment, the exhaust manifold 40 is configured to have the 4-2-1 pipe layout to increase a scavenging effect in the middle speed range. However, the exhaust system according to this embodiment shall not be limited to this layout. An exemplary configuration of the exhaust manifold may be a so-called "ejector effect" to increase the scavenging effect. Specifically, tapered individual exhaust pipes are brought together and met, and used as an exhaust manifold. Hence, when exhaust gas is ejected from a cylinder, a negative pressure acts on, for example, an individual exhaust pipe connected to another cylinder, and the exhaust gas is sucked out downstream from the individual exhaust pipe. This successfully increases the torque of the engine in the middle speed range in a similar manner to the 4-2-1 pipe layout.

What is claimed is:

1. An intake system of an engine, the intake system comprising:
    an engine including cylinders each communicating with an associated one of intake ports which are opened and closed by intake valves; and
    an intake manifold attached to a side portion of the engine, the intake manifold including: a surge tank defining a volume chamber; and individual runners having (i) upstream end portions connected to the surge tank, and (ii) downstream end portions connected to the intake ports, the individual runners defining individual intake passageways each connecting an associated one of the cylinders to the volume chamber, wherein
    each of the individual intake passageways includes:
        a first route including (i) a first upstream passageway extending from the volume chamber, and (ii) a downstream passageway continuing from the first upstream passageway and connected to the one cylinder, the first route having a natural frequency, of an air column, which is synchronized with a first revolution speed higher than an engine revolution speed for maximum torque such that a dynamic supercharging effect is obtained at the first revolution speed; and
        a second route including (i) a second upstream passageway extending from the volume chamber and continuing to the downstream passageway, and (ii) the downstream passageway, the second route having a natural frequency, of an air column, which is synchronized with a second revolution speed higher than the engine revolution speed for maximum torque such that a dynamic supercharging effect is obtained at the second revolution speed, the second upstream passageway being different from the first upstream passageway, and the second revolution speed being different from the first revolution speed,
    the first and second routes are always open regardless of a running state of the engine,
    the first upstream passageway and the second upstream passageway communicate, respectively through a first opening and a second opening, with the volume chamber, the first and second openings being open on a side face of the surge tank farther from the engine,
    the first and second openings are arranged in a direction of a cylinder axis of the engine, and
    a difference between the first and second revolution speeds is set greater than 0% and lower than or equal to 15% of a maximum engine revolution speed.

2. The intake system of claim 1, wherein
    a difference D and a diameter R satisfy a relationship of 1<D/R≤2 where the diameter R is a diameter of a true circle which corresponds to a cross-section area of the downstream passageway, and the difference D is a difference in length between the first and second routes.

3. The intake system of claim 2, wherein
    the diameter R is a diameter of a true circle which corresponds to a smallest cross-section area for each of the individual runners that defines the downstream passageway.

4. The intake system of claim 1, wherein
    each of the first and second upstream passageways is configured to extend, from the side face of the surge tank farther from the engine, in a direction away from the engine, and then to connect to the downstream passageway.

5. An intake system of an engine, the intake system comprising:
    an engine including cylinders each communicating with an associated one of intake ports which are opened and closed by intake valves; and
    an intake manifold attached to a side portion of the engine, the intake manifold including: a surge tank defining a volume chamber; and individual runners having (i) upstream end portions connected to the surge tank, and (ii) downstream end portions connected to the intake ports, the individual runners defining individual intake passageways each connecting an associated one of the cylinders to the volume chamber, wherein
    each of the individual intake passageways includes:

a first route including (i) a first upstream passageway extending from the volume chamber, and (ii) a downstream passageway continuing from the first upstream passageway and connected to the one cylinder, the first route having a natural frequency, of an air column, which is synchronized with a first revolution speed higher than an engine revolution speed for maximum torque such that a dynamic supercharging effect is obtained at the first revolution speed; and a second route including (i) a second upstream passageway extending from the volume chamber and continuing to the downstream passageway, and (ii) the downstream passageway, the second route having a natural frequency, of an air column, which is synchronized with a second revolution speed higher than the engine revolution speed for maximum torque such that a dynamic supercharging effect is obtained at the second revolution speed, the second upstream passageway being different from the first upstream passageway, and the second revolution speed being different from the first revolution speed, the first and second routes are always open regardless of a running state of the engine, the first upstream passageway and the second upstream passageway communicate, respectively through a first opening and a second opening, with the volume chamber, the first and second openings being open on a side face of the surge tank farther from the engine, and a difference between the first and second revolution speeds is set greater than 0% and lower than or equal to 15% of a maximum engine revolution speed.

* * * * *